May 6, 1969  J. DE SIMAS  3,442,434
CONTAINER AND PALLET
Filed Dec. 7, 1967  Sheet 1 of 2
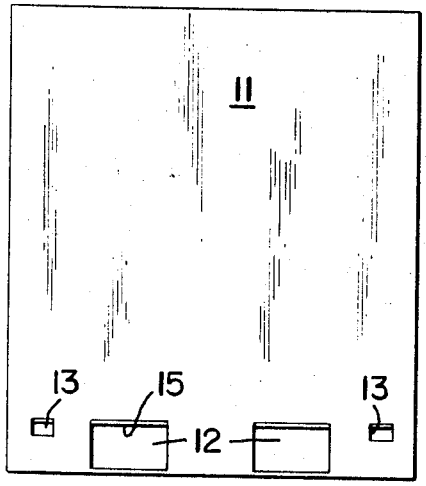
FIG_1
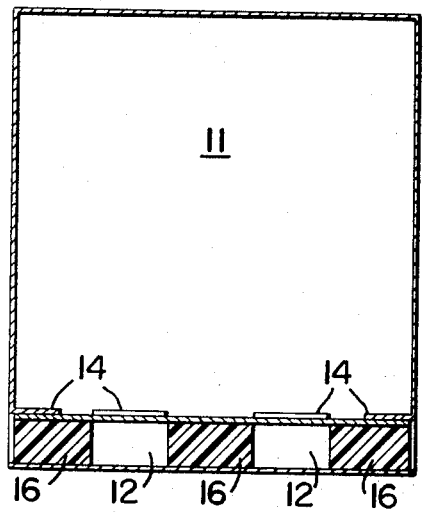
FIG_2
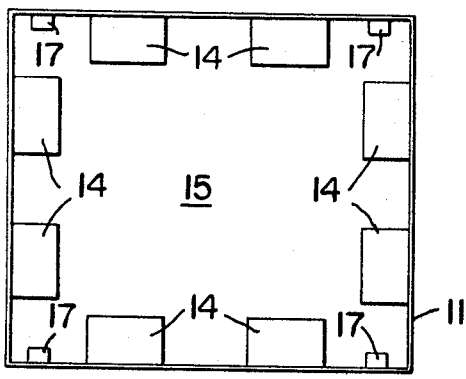
FIG_3
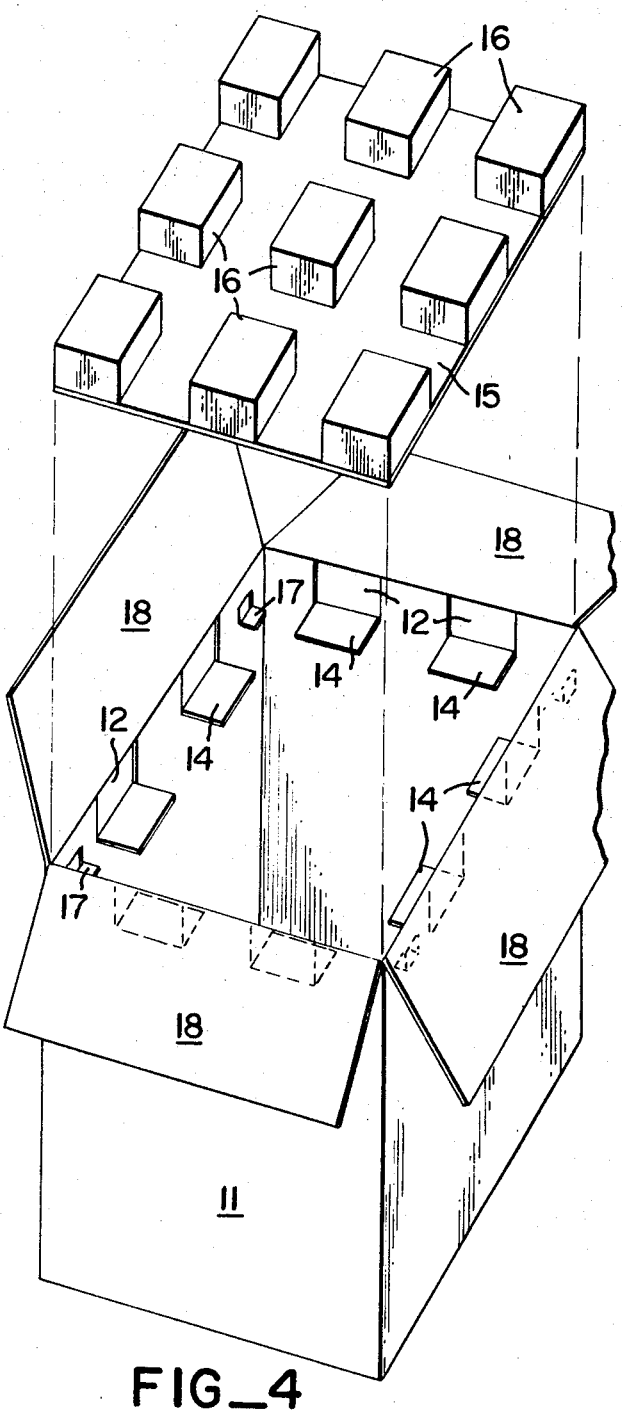
FIG_4
INVENTOR.
JOHN DeSIMAS
BY
Townsend and Townsend
ATTORNEYS

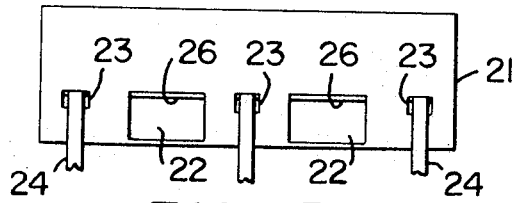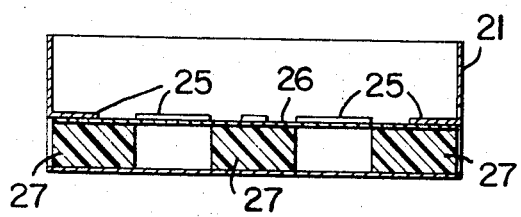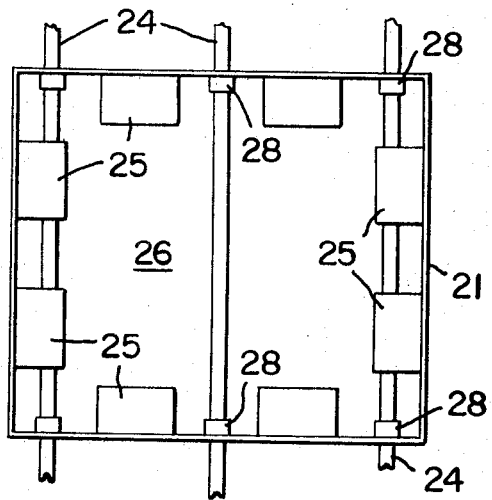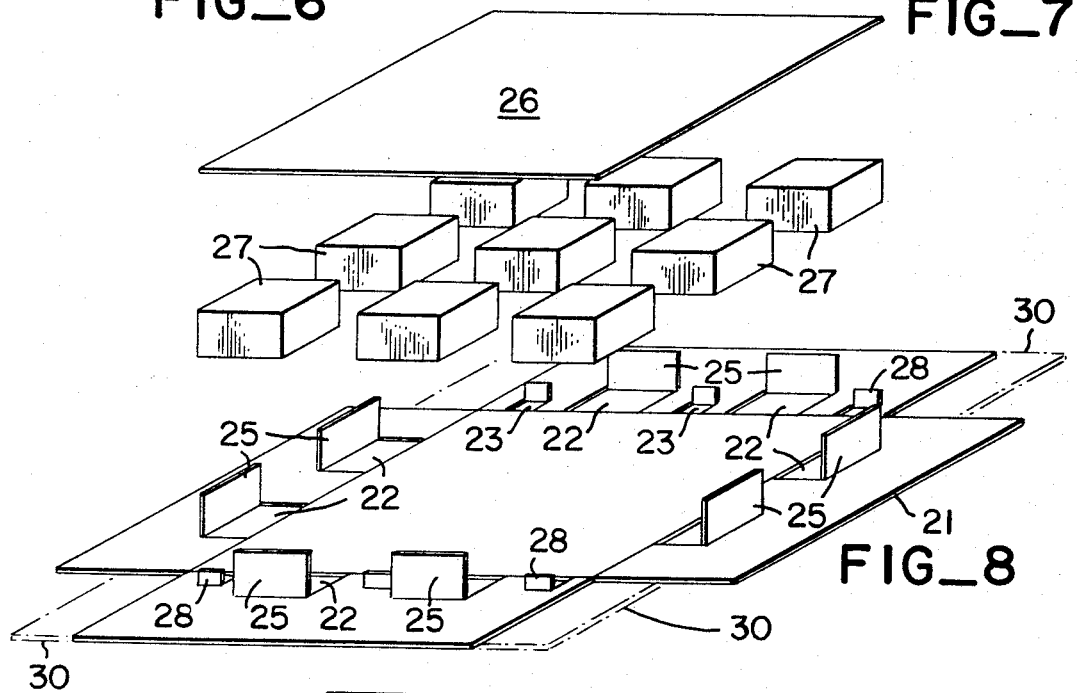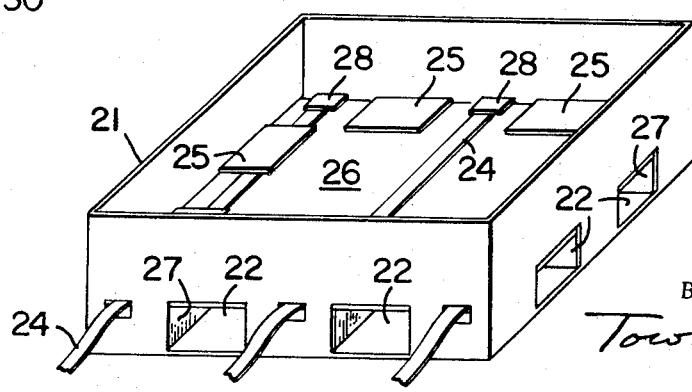

United States Patent Office 3,442,434
Patented May 6, 1969

3,442,434
CONTAINER AND PALLET
John De Simas, 960 Hillcrest,
Millbrae, Calif. 94030
Filed Dec. 7, 1967, Ser. No. 688,918
Int. Cl. B65d 5/56, 25/14, 5/62, 5/58
U.S. Cl. 229—14                        6 Claims

ABSTRACT OF THE DISCLOSURE

A composite container and pallet, and pallet suitable for custom design are disclosed comprising a cardboard container with cutout portions near the bottom for receiving the tines of a forklift truck. The flaps from the cutout portions provide means for positioning a baseboard on which the packaged goods rest. The baseboard is spaced from the bottom of the container by spacing blocks which bear the weight of the pacakaged goods and which may be made of a flexible material for shock-absorbing packaging.

---

This invention relates to new and improved containers and pallets adapted for transport by forklift trucks. In particular, the invention relates to new and improved cardboard containers having built-in pallets, and to new and improved pallets conforming to the shape of the container packaging with which they are to be used.

Pallets presently used with containers for transport by forklift trucks consist of a wooden frame on which the container sits, thereby providing space between the container and the ground for the tines of a forklift truck. Such wooden frame pallets do not generally conform to the shape of the containers with which they are used, so that during shipping, or storage of the containers and pallets, maximum use is not made of the available space. Furthermore, projecting edges of the pallets are subject to breakage during loading and unloading. Standard wood frame pallets are heavy and relatively expensive, and not well adapted to the growing air cargo industry. If the containers are not shipped with the pallets, loading and unloading of the containers onto or off the pallet is necessary at shipping points before forklift truck transport is possible.

It is an object of the present invention to provide new and improved containers having pallets integrally formed therein to provide maximum use of available space and eliminate pallet breakage. Another object of the invention is to provide new and improved lightweight and inexpensive composite containers and pallets, and custom made pallets, particularly suitable for cardboard packaging and lightweight shipping. A further object of the invention is to provide pallets with shock-absorbing capacity to provide damage-free shipping. According to the present invention, the composite container and pallet and custom made pallet are made in separate parts which are replaceable and reusable and which also are collapsable for shipping and reuse.

In order to accomplish these results the present invention contmplates the provision of a container of carboard or other suitable material having cutout portions in at least one sidewall near the bottom for the tines of the forklift truck. The flaps from the cutout portions provide means for positioning a baseboard on which the packaged goods rest. The baseboard is spaced from the bottom of the container by spacing blocks which may be formed either of a solid material for heavyweight shipping, or a flexible material for shock-absorbing packaging. The invention further contemplates the use of a container base portion, similarly formed, as a custom made pallet conforming to the shape of a shipping container which may be placed or strapped therein.

Other objects, features and advantages of the present invention will become apparent in the following specification and accompanying drawings.

FIG. 1 is a side elevation view of a composite container and pallet embodying the present invention.
FIG. 2 is a side cross-sectional view of the composite container and pallet.
FIG. 3 is a plan view from above of the composite container and pallet.
FIG. 4 is an exploded perspective view of the composite container and pallet in an upside down position showing the method of construction.
FIG. 5 is a side elevation view of a pallet embodying the present invention.
FIG. 6 is a side cross-sectional view of the pallet.
FIG. 7 is a plan view from above of the pallet.
FIG. 8 is an exploded perspective view of the pallet showing the method of construction.
FIG. 9 is a perspective view of the assembled pallet.

In the embodiment of the present invention illustrated in FIG. 1 there is provided a container 11 of corrugated cardboard, wood, aluminum or other suitable material. In the side walls of the container at the bottom are cutout portions 12 adapted to receive the tines of a forklift truck. Smaller cutout portions 13 may also be provided for reinforcing straps to enclose the portion of the container in which the goods are packaged. As shown in FIGS. 2 and 3, the cutout portions are formed with upper flaps 14 which extend at right angles from the wall of the container. The flaps 14 serve to position a baseboard 15 positioned below the flaps 14 and upon which rest the goods packaged in the container 11. The baseboard 15 is spaced from the bottom of the container by spacing blocks 16 which support the weight of the goods on baseboard 15. The spacing blocks 16 may be formed of a solid material or may be formed of a flexible material such as styrofoam, polyurethane foam or other suitable material to thereby act as shock absorbers for the packaged goods. The styrofoam, polyurethane foam, or other suitable material may be of varying density depending upon the weight of the supported goods. The number of spacing blocks and quantity of flexible material may also be varied. For extremely heavyweight goods, the spacing blocks will be formed of a solid material. The small flaps 17 shown in FIG. 3 indicate the positions where reinforcing straps may be fed laterally across the container above the baseboard 15 and below the packaged goods. The straps are therefore adopted to surround the portion of the container containing the packaged goods.

As illustrated in FIG. 4, the composite container and pallet is constructed with the container initially in an upside down position. The bottom flaps 18 of the container are open so that the cutout portions 12 adapted to receive the tines of the forklift truck may be formed. The resulting flaps 14 from the cutout portions 12 are extended at right angles from the side walls of the container 11. The baseboard 15, to which are attached by gluing or other suitable means the spacing blocks 16, is lowered into position on the outwardly extending flaps 14. The bottom flaps 18 of container 11 are then closed over the baseboard and spacing blocks and sealed, and the composite container and pallet then uprighted for use.

In the embodiment of the invention illustrated in FIGS. 5 through 9 there is provided a custom made pallet with side walls conforming to the shape of a shipping container adapted to be placed in the pallet and strapped in if desired. Referring to FIGS. 5 and 7 the pallet comprises a container portion 21 having a bottom and side walls formed of corrugated cardboard, wood, aluminum or other suitable material. Cutout portions 22 are formed in the side walls at the bottom of the container portion to receive the tines of a forklift truck. Smaller cutout portions 23 are also provided for the use of reinforcing straps 24 if desired. The cutout portions 22, adapted to receive tines of the forklift truck, are formed to provide flaps 25 which extend at right angles from the side walls of the container portion 21 at the top of the cutout portions 22. Positioned below the flaps 25 is a baseboard 26 upon which rests the shipping container for which the pallet is designed. The baseboard 26 is spaced from the bottom of the container portion by spacing blocks 27 which support the weight of the shipping container for which the pallet is designed. The spacing blocks may be formed of a solid material or a flexible material such as styrofoam to thereby provide shock absorbers for the shipping container. Styrofoam of varying density may be used depending upon the weight of the container. For extremely heavyweight containers, the spacing blocks would be formed of a solid material. As illustrated in FIG. 7, straps may be threaded through the holes 23 and beneath the corresponding small flaps 28 formed in the side walls of container base 21. Any number of straps may be used depending upon strength requirements. Flaps 25 may serve to hold the straps 24 out of the way of the shipping container. Thus, the straps 24 are adapted to surround the shipping container in which the goods are packaged.

Referring to FIG. 8, the pallet is constructed by providing a suitable cut form for the container base 21. Along the extensions of the form which are to serve as the side walls of the container base the holes 22, adapted to receive the tines of a forklift truck, are cut thereby also providing the flaps 25 which extend at right angles from the side wall portions of the container base 21 and which serve to position the baseboard 26. Spacer blocks 27 are attached by glue or other suitable means to either the baseboard 26 or the bottom of the container base 21. With the baseboard spacers positioned at the bottom of the cut form for the container base, the extensions of the cut form are folded up so that flaps 25 rest over the baseboard 26, with spacing blocks 27 positioned between the baseboard and the bottom of the cardboard container base. The side wall portions are secured together by suitable means. For this purpose, fold-over extensions 30 may be provided on two of the side wall portions of the cardboard container base for stapling or gluing the side wall portions together. The assembled pallet is shown in FIG. 9.

It is apparent that the composite container and pallet described herein are adapted for custom design to suit particular packaging and container needs. While two embodiments of the invention have been shown and described, other adaptations and modifications may be made without departing from the true scope and spirit of the invention.

What is claimed is:

1. A composite container and pallet comprising: a cardboard container adapted for packaging and shipping goods, said container having cutout portions therein at the bottom of the side wall of at least one side of the container adapted to receive the tines of a forklift truck and also having flaps from the tops of said cutout portions extending into the container; a flat base having a perimeter conforming in shape and size to the bottom of the container positioned adjacent and below the flaps of the cutout portions and on which the packaged goods may be positioned; and a plurality of spacing blocks positioned between the flat base and the bottom of the container adapted to bear the weight of the packaged goods and maintain the flat base and container bottom in spaced relationship.

2. A composite container and pallet as set forth in claim 1 wherein said spacing blocks are formed of a flexible material to thereby provide shock absorbers for the packaged goods.

3. A pallet for transport of packaged goods by forklift truck comprising: a cardboard container portion having a bottom and side walls wherein packaged goods may be placed, said container portion having cutouts therein at the bottom of the sidewall of at least one side of the container portion adapted to receive the tines of a forklift truck; said container portion including flaps from the tops of said cutouts extending inwardly of the container portion; a flat base positioned in the container portion at the top of the cutouts adjacent and beneath the inwardly extending flaps from the cutouts and on which packaged goods may be positioned; spacing means of a flexible material positioned between the flap base and container portion bottom to bear the weight of packaged goods and maintain the flat base and container portion bottom in spaced relationship; said container portion including holes in at least two opposite sides whereby reinforcing straps may be positioned for surrounding a portion of the pallet and packaged goods positioned therein.

4. A pallet for transport of packaged goods by forklift truck comprising: a cardboard container portion having a bottom and side walls wherein packaged goods may be placed, said container portion having cutouts therein at the bottom of the side wall of at least one side of the container portion adapted to receive the tines of a forklift truck, said container portion including flaps from the tops of said cutouts extending inwardly of the container portion; a flat base positioned in the container portion at the top of the cutouts adjacent and beneath the inwardly extending flaps from the cutouts and on which packaged goods may be positioned; spacing means positioned between the flap base and container portion bottom to bear the weight of packaged goods and maintain the flat base and container portion bottom in spaced relationship.

5. A pallet as set forth in claim 4 wherein said spacing means is formed of a flexible material to thereby provide shock absorber means for a container of packaged goods positioned in the pallet.

6. A composite container and pallet for transport of goods by forklift truck comprising: a cardboard container having a bottom and side walls for receiving goods to be shipped, said container having cutouts therein at the bottom of the side wall of at least one side of the container adapted to receive the tines of a forklift truck, said container including flaps from the tops of said cutouts extending inwardly of the container; a flat base positioned in the container at the top of the cutouts adjacent and beneath the inwardly extending flaps from the cutouts and on which packaged goods may be positioned; spacing means positioned between the flat base and container bottom to bear the weight of packaged goods and maintain the flat base and container bottom in spaced relationship.

References Cited
UNITED STATES PATENTS

| | | | |
|---|---|---|---|
| 2,685,398 | 8/1954 | King | 229—6 |
| 3,069,059 | 12/1962 | Desbois | 229—14 |
| 3,275,131 | 9/1966 | Erickson | 229—14 |

DAVID M. BOCKENEK, *Primary Examiner.*

U.S. Cl. X.R.

229—6, 23